United States Patent
Lin et al.

(10) Patent No.: US 11,175,625 B2
(45) Date of Patent: Nov. 16, 2021

(54) METHOD AND AN IMAGING SYSTEM FOR HOLOGRAPHIC IMAGING

(71) Applicant: IMEC VZW, Leuven (BE)

(72) Inventors: Ziduo Lin, Heverlee (BE); Abdulkadir Yurt, Heverlee (BE); Richard Stahl, Rotselaar (BE); Geert Vanmeerbeeck, Keerbergen (BE)

(73) Assignee: IMEC VZW, Leuven (BE)

( * ) Notice: Subject to any disclaimer, the term of this patent is extended or adjusted under 35 U.S.C. 154(b) by 305 days.

(21) Appl. No.: 16/467,612

(22) PCT Filed: Dec. 8, 2017

(86) PCT No.: PCT/EP2017/082012
§ 371 (c)(1),
(2) Date: Jun. 7, 2019

(87) PCT Pub. No.: WO2018/104517
PCT Pub. Date: Jun. 14, 2018

(65) Prior Publication Data
US 2019/0310584 A1 Oct. 10, 2019

(30) Foreign Application Priority Data
Dec. 9, 2016 (EP) .................................... 16203210

(51) Int. Cl.
*G03H 1/04* (2006.01)
*G03H 1/00* (2006.01)
*G03H 1/02* (2006.01)

(52) U.S. Cl.
CPC ......... *G03H 1/0486* (2013.01); *G03H 1/0005* (2013.01); *G03H 1/0443* (2013.01);
(Continued)

(58) Field of Classification Search
CPC .. G03H 1/0486; G03H 1/0005; G03H 1/0443; G03H 1/0465; G03H 2226/11;
(Continued)

(56) References Cited

U.S. PATENT DOCUMENTS 6,172,752 B1 * 1/2001 Haruna .................. G01B 11/06
356/485
9,256,204 B2 2/2016 Huys et al.
(Continued)

OTHER PUBLICATIONS

PCT International Search Report and Written Opinion, PCT International Application No. PCT/EP2017/082012, dated Mar. 15, 2018, 13 pages.

*Primary Examiner* — Audrey Y Chang
(74) *Attorney, Agent, or Firm* — McDonnell Boehnen Hulbert & Berghoff LLP

(57) ABSTRACT

Example embodiments relate to methods and imaging systems for holographic imaging. One embodiment includes a method for holographic imaging of an object. The method includes driving a laser using a current which is below a threshold current of the laser. The method also includes illuminating the object using illumination light output by the laser. Further, the method includes detecting an interference pattern formed by object light, having interacted with the object, and reference light of the illumination light.

20 Claims, 3 Drawing Sheets

(52) U.S. Cl.
CPC ..... *G03H 1/0465* (2013.01); *G03H 2001/005* (2013.01); *G03H 2001/0212* (2013.01); *G03H 2001/0447* (2013.01); *G03H 2001/0471* (2013.01); *G03H 2001/0491* (2013.01); *G03H 2222/12* (2013.01); *G03H 2222/20* (2013.01); *G03H 2226/11* (2013.01)

(58) Field of Classification Search
CPC ......... G03H 2222/20; G03H 2001/005; G03H 2001/0212; G03H 2001/0447; G03H 2001/0471; G03H 2001/0491; G03H 2222/12; G01B 9/02057; G01B 11/06; G11B 19/2054
USPC .......................... 356/51, 450, 457, 485, 519
See application file for complete search history.

(56) References Cited

U.S. PATENT DOCUMENTS

| | | | |
|---|---|---|---|
| 2009/0059978 A1* | 3/2009 | Nagashima | G11B 19/2054 372/34 |
| 2011/0007323 A1* | 1/2011 | De Groot | G01B 9/02057 356/519 |
| 2012/0218379 A1 | 8/2012 | Ozcan et al. | |
| 2012/0248292 A1* | 10/2012 | Ozcan | G03H 1/0443 250/208.1 |
| 2014/0268105 A1* | 9/2014 | Bills | G01N 21/453 356/51 |

\* cited by examiner

METHOD AND AN IMAGING SYSTEM FOR HOLOGRAPHIC IMAGING

CROSS-REFERENCE TO RELATED APPLICATION

The present application is a national stage entry of PCT/EP2017/082012 filed Dec. 8, 2017, which claims priority to EP 16203210.6 filed on Dec. 9, 2016, the contents of each of which are hereby incorporated by reference.

FIELD OF THE DISCLOSURE

The present disclosure relates to a method for holographic imaging. The disclosure also relates to an imaging system for holographic imaging.

BACKGROUND

Digital holography is an emerging field which may be useful in numerous different applications for imaging and analysis of objects. Digital holography makes use of a digital image sensor, such as a charge-coupled device (CCD) or a complementary metal-oxide-semiconductor (CMOS) image sensor.

A digital hologram may be obtained through lens-free or lensless imaging, wherein no lenses are necessary in order to generate an image of an object. Thus, use of digital holography enables a cost-effective, compact and lightweight imaging method, which may be used e.g. in microscopy applications.

In digital holography, a light beam providing uniform illumination of an object is used for creating an interference pattern based on object light, having interacted with an object, and reference light of the light beam. The interference pattern may be acquired by the digital image sensor and then, the acquired interference pattern may be reconstructed in order to determine an image of the object.

However, components in an optical system for acquiring the interference pattern may affect the acquired pattern and may thus also affect the reconstructed image. For instance, a system for acquiring a digital hologram may typically involve one or more surfaces, where the light beam is directed through reflection or transmission (such as mirrors, a cover glass over an object to be analyzed, sample substrates, etc.). In particular, when a fluidic sample is imaged, a light beam normally passes several interfaces that are based on presenting the sample in the system. Multiple reflections in such interfaces between media of different refractive indices may cause interference, which may affect quality of the acquired interference pattern. Thus, there may be a need to minimize a number of interfaces in the optical system, which may also affect a freedom to use the optical system for holographic imaging.

In US 2012/0218379, a system is disclosed, wherein a spatial filter having an aperture disposed therein is configured to allow the passage of illumination. Then, an illumination source is configured to illuminate a sample through the aperture with the spatial filter being interposed between the illumination source and a sample holder. This implies that a completely incoherent source can be used. With this configuration, the system may not be as sensitive to interference by multiple reflections in interfaces between surfaces arranged in an optical path of the illumination beam.

However, spatial filtering of incoherent light is inherently a very low efficient process due to a mode mismatch between the light source and the aperture leading to waste of significant optical power. This also implies that resolution of holographic images acquired with this system will be relatively low.

Thus, there is a need to improve various aspects of holographic imaging.

SUMMARY

The present disclosure provides an improved holographic imaging. Further, the present disclosure provides holographic imaging which is not particularly sensitive to reflections in interfaces arranged in an optical path.

These and other objectives of the present disclosure are at least partially met by embodiments as defined in the independent claims. Additional embodiments are set out in the dependent claims.

According to a first aspect, there is provided a method for holographic imaging of an object, comprising: driving a laser using a current which is below a threshold current of the laser; illuminating the object using illumination light output by the laser; and detecting an interference pattern formed by object light, having interacted with the object, and reference light of the illumination light.

According to some embodiments, a laser is used for illuminating an object for holographic imaging. However, contrary to ordinary and intended use of a laser, the laser is driven using a current which is below a threshold current of the laser. Thus, the laser is used for outputting light which has a low temporal coherence, as the laser is driven below a threshold current and light amplification of the laser is therefore not larger than losses in the laser. Hence, emitted radiation will be dominated by spontaneous emission.

The use of the laser allows radiation to be output with a high spatial coherence, a laser may be inherently used as a point source which emits radiation originating from a very small light emitting area. A laser cavity may provide a narrow confinement which may act to ensure that the output light has a high spatial coherence. Also, the spatial coherence of light may be reinforced by some stimulated emission of radiation, even when the laser is driven below the threshold current. Therefore, it is an insight of the disclosure, that a laser source driven in a subthreshold regime may be used for providing light with high spatial coherence, which allows forming an interference pattern so as to analyze an illuminated object, while still providing low temporal coherence so that any reflections from interfaces in the optical path will not cause interference.

Thus, the method allows providing holographic imaging using an inexpensive and straightforward system, while still providing quality holographic imaging of objects.

The illuminating of the object uses illumination light output by the laser when driven using the current which is below the threshold current.

As used in the context of this application, "holographic imaging" should be construed as any type of imaging that allows an interference pattern to be formed from a relation of object light having interacted with an object to reference light, which has not interacted or been affected by the object. The holographic imaging may thus be achieved without use of any lenses for forming of an image plane and may therefore also be referred to as lens-free or lensless imaging. However, strictly speaking, the holographic imaging need not be completely lens-free. Rather, although not necessary, lenses may be used in some part of an optical path.

The light interacting with the object may interact in many different manners with the object, such as by being attenuated, reflected, refracted, diffracted and/or phase modulated by the object. The reference light may be guided through a different optical path so as to not pass the object at all, or may be transmitted through the object unaffected when the object is partly transparent. The term "reference light" should be construed as light not being affected by the object. The object and reference light may be within a common light beam as part of the light beam may interact with the object and part of the light beam may be transmitted without interacting with the object.

According to an embodiment, the method further comprises reconstructing an optical image of the object based on the detected interference pattern. The reconstruction enables an optical image to be digitally formed, such that image processing of the detected interference pattern is sufficient in order to obtain an optical image.

According to an embodiment, the method further comprises controlling a driver circuitry to control the current driving the laser. The driver circuitry may ensure that the laser is driven below the threshold current, such that specified light is output by the laser.

When the laser is driven below the threshold current, intensity of output light will be very small compared to when the laser is outputting laser light. Hence, driving current close to the threshold current may allow the intensity of output light to be as high as possible, without the laser outputting laser light or interference fringes from multiple reflections in interfaces being formed in the detected interference pattern. In one embodiment, the laser is driven using a current of a magnitude such that the current is below the threshold current while the laser is still outputting light for illuminating of the object so that the interference pattern may be formed.

According to an embodiment, the method further comprises identifying undesired interference fringes in the detected interference pattern; and in response to such identifying, controlling the driver circuitry to decrease the current driving the laser and detecting a second interference pattern based on the illumination light output by the laser driven using a decreased current. The sensitivity of the holographic imaging to temporal coherence of output light may be dependent on the arrangement of the imaging (for instance, the number of interfaces and mismatch of refractive indices of media). Thus, it may not be easy to know in advance whether driving the laser at a specific current will produce a holographic image of specified quality. Hence, an iterative procedure may be used such that when an interference pattern comprising undesired interference fringes due to multiple reflections of light in the optical path is detected, the current driving the laser may be decreased to reduce a temporal coherence of the illumination light.

A specification of a laser source may provide a threshold current of the laser source. However, the specification may not be very accurate. Hence, in order to ensure that laser light will not be output, the laser source may be driven using a current which is substantially below the specified threshold current. Alternatively, the current may be decreased if a first detected interference pattern comprises undesired interference fringes.

According to an embodiment, the method further comprises receiving a measurement of a parameter relevant to the threshold current, wherein the controlling of the driver circuitry is based on the measurement of the parameter. By receiving a measurement of the parameter, the controlling may ensure that the driving current is close to the threshold current while not exceeding the threshold current.

For instance, according to an embodiment, the controlling of the driver circuitry is based on an ambient temperature to the laser. The temperature of the laser medium may strongly affect the threshold current of the laser and, when the ambient temperature differs, the threshold current may also differ. The controlling based on an ambient temperature may set a first current value to be used in driving the laser, which may be adapted if it is found that undesired interference fringes are detected.

According to an embodiment, the object is imaged by in-line holographic imaging. In other words, the object light, which may interact with the object, and the reference light, not interacting with the object, may share a common optical axis, i.e. they may be "in line". In-line holographic imaging allows a very compact arrangement set up, as there is no need for a reference beam to be split out from an illumination beam and guided through a different optical path than the illumination beam. In-line holographic imaging may be especially useful in illumination of mainly transparent objects.

Although in-line holographic imaging may allow use of a very compact arrangement, it should be realized that the method may be used for other types of systems in which an interference pattern is formed.

According to a second aspect, use is made of the method according to the first aspect for holographic microscopy.

Effects and features of this second aspect are largely analogous to those described above in connection with the first aspect. Embodiments mentioned in relation to the first aspect are largely compatible with the second aspect.

The holographic imaging provided by the method of the first aspect may be used for holographic microscopy, wherein objects may be studied using an inexpensive and compact system, as for instance no image forming lens is necessary.

According to a third aspect, there is provided an imaging system for holographic imaging, wherein the imaging system comprises: a laser source arranged to output illumination light towards an object; an image sensor comprising light-detecting elements arranged to detect an interference pattern formed by object light, having interacted with the object, and reference light of the illumination light; and a controller, which is arranged to control a current driving the laser to maintain the current below a threshold current of the laser.

Effects and features of this third aspect are largely analogous to those described above in connection with the first and second aspects. Embodiments mentioned in relation to the first and second aspects are largely compatible with the third aspect.

The controlling of the current driving the laser allows the imaging system to ensure that the laser is driven below the threshold current. Hence, the imaging system uses a laser source to provide output of illumination light of high spatial coherence, while driving the laser source in a subthreshold regime such that the output illumination light has low temporal coherence.

Thus, the imaging system provides an inexpensive and straightforward system, which may be used for quality holographic imaging of objects.

Components of the imaging system may be provided within a common housing, providing a well-defined arrangement between the laser source and the image sensor. However, the imaging system may alternatively comprise separate parts, which may be arranged in a system for illuminating an object and imaging an object, wherein the system may also be adaptable, e.g. to different measurements to be made.

The imaging system may be arranged to image objects, wherein the images may be transmitted to external devices, e.g. for display or further analysis. However, the imaging system may also be part of a larger system or integrated in an apparatus e.g. for analysis of objects.

Thus, the imaging system could be part of an instrument for digital holography and microscopy, wherein the imaging system may comprise a display enabling presenting of a digital holographic image to a user.

According to a fourth aspect, there is provided a measurement instrument, comprising the imaging system according to the third aspect, wherein the measurement instrument is arranged to determine a measure of the object based on processing of the detected interference pattern.

Effects and features of this fourth aspect are largely analogous to those described above in connection with the first, second, and third aspects. Embodiments mentioned in relation to the first, second, and third aspects are largely compatible with the fourth aspect.

By arranging the imaging system in a measurement instrument, an inexpensive and straightforward system, which may be used for quality holographic imaging of objects, may also be integrated within a device for providing a measure of an object based on the holographic imaging.

The measurement instrument may be used to measure a specific type of object. However, different measurement instruments could be used for measurements of very different types of objects. Hence, a measurement instrument according to the fourth aspect could be used in very different applications. For instance, the measurement instrument could be a diagnostic device used in biomedical purposes. However, the measurement instrument could alternatively be used for use in industrial inspection of objects.

According to an embodiment, the object is a body fluid sample. The measurement instrument could thus for example be used for blood cell counting, identification or classification of cells.

According to an embodiment of the imaging system, the controller is arranged to also control the image sensor to detect the interference pattern. The controller may thus be arranged to control both the laser source and the image sensor. This may allow the controller to synchronize actions of the laser source and the image sensor, e.g. for synchronizing illumination and an exposure time of the image sensor.

The controller could comprise circuitry connecting the controller to the laser source and/or the imaging sensor, in order for the controller to be arranged to transmit control signals. The controller could thus be implemented in specialized hardware, wherein controlling functionality may be set by the hardware circuitry.

However, the controller could alternatively comprise a processing unit, which may execute software for implementing the controlling of the laser source and/or the imaging sensor. The controller may then provide an operator software of the imaging system, with which an operator may interact for operating the imaging system. This also enables altering operation of the imaging system in a straightforward manner by allowing the functionality of the controller to be changed by changing the software.

According to an embodiment, the imaging system further comprises a processing unit, which is arranged to receive the interference pattern from the image sensor and is arranged to reconstruct an optical image of the object based on the interference pattern.

The processing unit could be part of the controller. The controller may thus comprise a processing unit, which may be arranged to control (e.g. through specific processes executed on the processing unit) the laser source and/or the image sensor. The processing unit may further be arranged, through another process executed on the processing unit, to process the received interference pattern and form an optical image of the object.

According to an embodiment, the laser source is a laser diode. Thus, the imaging system may use a conventional laser diode adapted for output of light of a specified wavelength. A total cost of the imaging system may hence be low, as the imaging system may make use of at least some conventional components.

A conventional laser source may be provided and there may not be a need to adapt the laser source to the set up for the imaging system in order to allow use of the laser source in the imaging system. Hence, use may be made of a laser source which is arranged to output illumination light originating from a small light emitting area so as to provide a spatial coherence of the output light. In some embodiments, the laser source may thus comprise a partially reflective mirror, which is arranged to output illumination light from the laser source and thereby confine a spatial spread of the output illumination light.

According to an embodiment, the controller is arranged to receive an indication based on undesired interference fringes being identified in the detected interference pattern, wherein the controller is arranged to decrease a current driving the laser based on the received indication. Hence, the controller may be arranged to adapt the driving current when it is determined that a quality of the holographic image is not acceptable.

According to an embodiment, the controller is arranged to control the current based on an ambient temperature to the laser. The controller may thus use the ambient temperature at least for setting a first driving current to be used. If the detected interference pattern includes undesired interference fringes, the controller may further decrease the current and a second interference pattern may be detected.

BRIEF DESCRIPTION OF THE DRAWINGS

The above, as well as additional features, will be better understood through the following illustrative and non-limiting detailed description of example embodiments, with reference to the appended drawings. In the drawings like reference numerals will be used for like elements unless stated otherwise.

DETAILED DESCRIPTION

Detailed embodiments will now be described with reference to the drawings.

Figure 1:
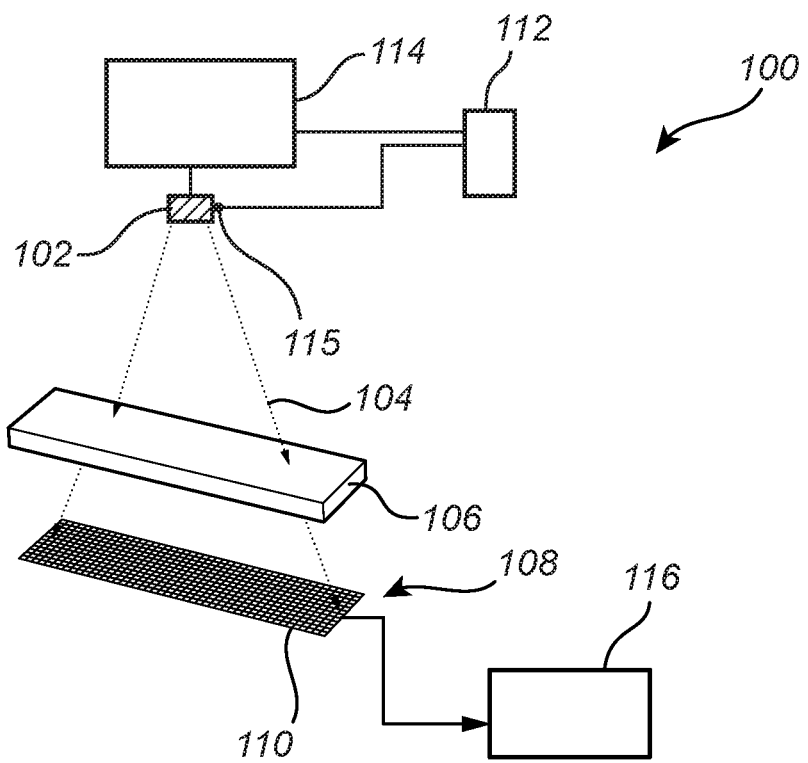
FIG. 1 is a schematic view of an imaging system, according to example embodiments.

Referring now to FIG. 1, an imaging system 100 for holographic imaging is illustrated. The imaging system 100 comprises a laser source 102 which is arranged to output illumination light 104 towards an object 106. The imaging system 100 is arranged to provide a system wherein object light, formed by the illumination light 104 having interacted with the object 106, and reference light of the illumination light 104 form an interference pattern, e.g. a hologram.

The imaging system 100 further comprises an image sensor 108 for detecting the interference pattern. The image sensor 108 may comprise an array of light-detecting elements 110 for detecting an intensity of light incident on the respective light-detecting element 110. Thus, each light-detecting element 110 may detect a light intensity of a portion of the interference pattern such that the array of light-detecting elements 110 together may detect the interference pattern.

The detection of the interference pattern allows forming of an optical image of the object 106 based on the interference pattern. The optical image may be formed by digital reconstruction process, which may use a numerical reconstruction algorithm for calculating the optical image corresponding to the detected interference pattern. The optical image may later be used for analysis or measurements on the object 106.

The interference pattern may be formed thanks at least partly to a spatial coherence of the illumination light. The spatial coherence describes a correlation (or predictable relationship) between waves at different points in space. When the illumination light interacts with the object 106, the object light may cause an interference pattern with reference light spatially close to a point in which interaction, e.g. diffraction, occurs. The interference pattern may thus provide a representation of the object 106 in terms of the light interaction caused by the object 106.

Further, a temporal coherence of the illumination light describes a correlation between waves observed at different points in time. Multiple reflections in interfaces arranged in the optical path may imply that different portions of the illumination light will reach an image sensor at different points in time. Thus, if the illumination light has a high temporal coherence, the illumination light may interfere with itself due to such multiple reflections and affect the detected interference pattern by forming interference fringes in the detected interference pattern substantially lowering the quality of the optical image of the object 106.

The imaging system 100 comprises a laser source 102, which normally outputs light having high spatial coherence and high temporal coherence. Thus, the laser source 102 could output illumination light that makes the imaging system 100 sensitive to e.g. reflections in interfaces in the optical path. It should be realized that such reflections may be Fresnel reflections which will occur even if the interface between two media with different reflective indices is perfectly plane and the illumination light is incident on the interface in a direction parallel to a normal to the plane. However, thin cavities or surface irregularities may also give rise to interference fringes in the detected interference pattern.

However, in the imaging system 100, the laser source 102 is driven by a current which is below a threshold current of the laser source 102. This implies that the laser source 102 does not output illumination light that is dominated by stimulated emission. Hence, the output illumination light may have a low temporal coherence. However, thanks to the use of a laser source 102, illumination light may be output from a very small light emitting area. Also, even when driven below the threshold current, some stimulated emission may occur in the laser source 102. This implies that the illumination light may have a high spatial coherence.

For instance, a laser source 102 may include a small laser cavity in which the laser medium for emission of radiation is arranged. Thus, light will be emitted from a small light emitting area formed by the laser cavity.

Therefore, by driving the laser source 102 with a current which is below the threshold current of the laser source 102, a source for illumination light having specified characteristics may be easily provided and controlled.

The laser source 102 may be driven using a current close to the threshold current. This implies that the laser source 102 may output light of as high intensity as possible, without the laser outputting laser light. Also, the laser source 102 may be driven relatively close to the threshold current in order to output any illumination light. However, at the threshold current, the laser source 102 may be sensitive to current and temperature of the laser medium, as a small variation in current may cause a very large change in intensity of output illumination light (if the driving current varies above the threshold current) and may also cause light with an undesirably high temporal coherence to be output.

The laser source 102 may be any type of laser. In one embodiment, the laser source 102 may be a laser diode, which may be very small and may be implemented into a semiconductor device.

The imaging system 100 may further comprise a controller 112, which may be arranged to control a current driving the laser source 102. The controller 112 may thus provide a control signal to a laser diode driver 114, which provides a supply current to the laser source 102.

The controller 112 may be arranged to ensure that the supply current to the laser source 102 is below the threshold current. A laser source 102 may define a feedback structure such that spontaneously emitted light will be coupled back into a laser cavity for stimulating emission of radiation so as to strongly amplify the emitted radiation. A threshold current of the laser source 102 may be defined as a current at which an optical gain of the laser medium is exactly balanced by a sum of all the losses experienced by light in one round trip of the optical cavity of the laser. Thus, when the laser source 102 is driven below the threshold current, the output illumination light is not dominated by stimulated emission, the temporal coherence of the illumination light is low and a quality interference pattern may be detected.

Figure 2:
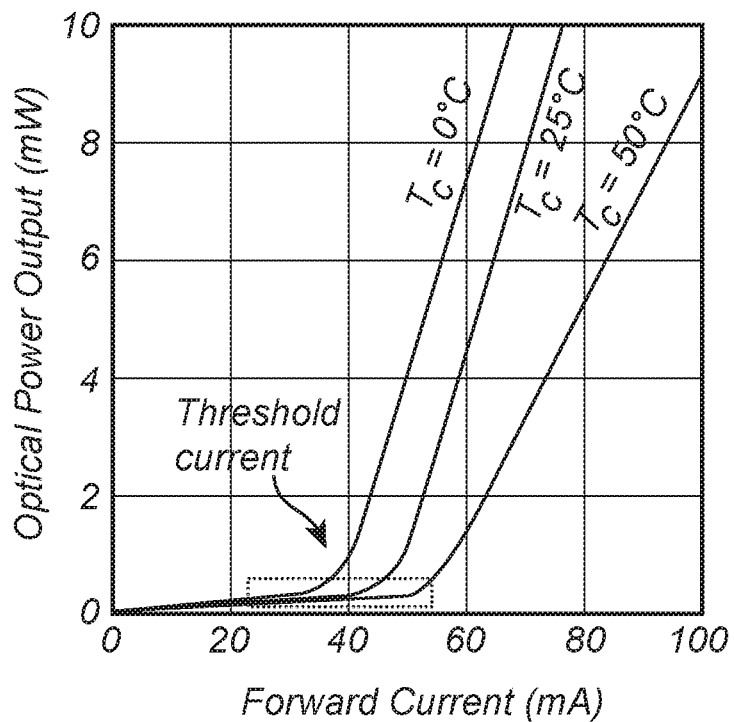
FIG. 2 is a graph illustrating intensity of output light in relation to a driving current, according to example embodiments.

As shown in FIG. 2, a threshold current of the laser source 102 may be highly dependent on the temperature of the laser medium. In FIG. 2, the output intensity of light from a laser source as a function of driving current is illustrated. Three different lines are shown based on different temperatures in the laser medium. At the threshold current, the output intensity of light starts to increase exponentially. It is clear from FIG. 2 that the threshold current is highly dependent on the temperature of the laser medium, as the threshold current for a temperature of 0° C. is about 35 mA, whereas the threshold current for a temperature of 50° C. is about 55 mA.

The dependence of the threshold current on the temperature may make it difficult for the controller 112 to know what current may be used for driving the laser source 102 without causing output of laser light. Also, a specification of the laser source 102 defining the threshold current (and its dependence on temperature) may not be very accurate. The controller 112 may thus be arranged to control the laser diode driver 114 to supply a current e.g. within 60-95% of a threshold current, and it may be desired specified that the supplied current is within the box indicated by dashed lines in FIG. 2.

However, a quality of the detected interference pattern may also be determined. If the detected interference pattern comprises interference fringes, it can be concluded that the output light has a too high temporal coherence, which may be adjusted for. Thus, in such case, the controller 112 may be arranged to control the laser diode driver 114 to decrease a supply current, such that temporal coherence of the output illumination light is decreased.

Presence of interference fringes may be detected by performing digital image processing on the detected interference pattern. Thus, the quality of the detected interference pattern may be automatically detected and reported to the controller 112 for adjusting the supply current to the laser source 102.

The imaging system 100 may further comprise a sensor 115 for measuring an ambient temperature to the laser. The controller 112 may be connected to the sensor 115 for receiving a measurement of the ambient temperature. The ambient temperature may affect the threshold current of the laser source 102 (e.g. the threshold current may substantially differ if the laser source 102 is used in an incubator compared to in room temperature). When imaging is to be initiated, the controller 112 may set a supply current depending on the ambient temperature, e.g. so that the supply current is close to the threshold current at the given ambient temperature. The controller 112 may then be arranged to control the laser diode driver 114 for detecting further interference patterns, if it is found that interference fringes are present in a first detected interference pattern.

It should be realized that the sensor 115 may measure another temperature which may be indicative of a temperature in the laser medium. For instance, the sensor 115 may be arranged to sense a temperature of a plate or another cooling medium configured to cool or control the temperature of the laser medium.

The controller 112 may be implemented in hardware, or as any combination of software and hardware. The controller 112 may for instance include a physical activator for manually or automatically controlling a driving current by engaging the activator. The controller 112 may also be implemented as software being executed on a general-purpose computer, as firmware arranged e.g. in an embedded system, or as a specifically designed processing unit, such as an Application-Specific Integrated Circuit (ASIC) or a Field-Programmable Gate Array (FPGA).

The imaging system 100 may include a processing unit 116. The processing unit 116 may be arranged to receive the interference pattern detected by the image sensor 108. The processing unit 116 may further be arranged to reconstruct an optical image of the object. The processing unit 116 may thus determine the optical image corresponding to the detected interference pattern, using any type of conventional calculations.

The processing unit 116 may for instance be implemented as software being executed on a general-purpose computer, as firmware arranged e.g. in an embedded system, or as a specifically designed processing unit, such as an Application-Specific Integrated Circuit (ASIC) or a Field-Programmable Gate Array (FPGA).

The processing unit 116 may be arranged to both provide processing of the interference pattern and also provide control of the driving current of the laser source 102 and control of any other parts of the imaging system 100. Thus, the controller 112 may include the processing unit 116 and may comprise software program(s) for configuring the processing unit 116 to control the laser source 102 and/or the image sensor 108 and also for processing the detected interference pattern.

In one embodiment, a software may be provided for allowing an operator to control any component in the imaging system 100 and for also making any further analysis of the optical image that may be reconstructed of the object 106. The operator may thus control the imaging system 100 through such software via e.g. an interface to a computer running the software.

The imaging system 100 could be arranged as separate parts. The separate parts may be oriented in a fixed relation to each other during installation of the imaging system 100. Alternatively, an experienced user could use the separate parts to alter the imaging system 100, e.g. to adapt the imaging system 100 for imaging different types of objects 106.

The imaging system 100 could alternatively be arranged in a common housing, wherein a relation between the laser source 102, a position of an object 106 and the image sensor 108 is well-defined.

The imaging system 100 could also be part of an apparatus or instrument, which comprises other components. For instance, the imaging system 100 could be arranged in a camera application, wherein a display is provided for enabling presenting of the digitally reconstructed optical image of the object 106 to a user.

The imaging system 100 could also be arranged in a measurement instrument, which may be arranged to pre-process the object 106 to prepare it for imaging and/or make other measurements on the object 106 before the object 106 is arranged to be illuminated by the laser source 102 so as to allow the interference pattern to be detected.

The measurement instrument may further be arranged to determine a measure of the object 106. This measure may be determined based on processing of the detected interference pattern or analyzing/processing the reconstructed optical image of the object 106. The determination of the measure may be performed in the processing unit 116 described above, which may be a processing unit 116 that controls functionality of all components of the measurement instrument.

The measurement instrument could be an instrument for industrial inspection, whereby a quality or a characteristic of an object 106 may be determined. The object 106 could for instance be a product being manufactured in an industrial process, whereby the measurement instrument may be used in controlling the process.

The measurement instrument could in another embodiment form a diagnostic device, allowing e.g. for biomedical diagnosis to be performed. The diagnostic device could be arranged to perform holographic imaging, such as holographic microscopy on a sample of a body fluid. This could allow the diagnostic device to determine measure that may have diagnostic meaning, such as counting blood cells in the sample, identifying cells or classifying cells.

Figure 3:
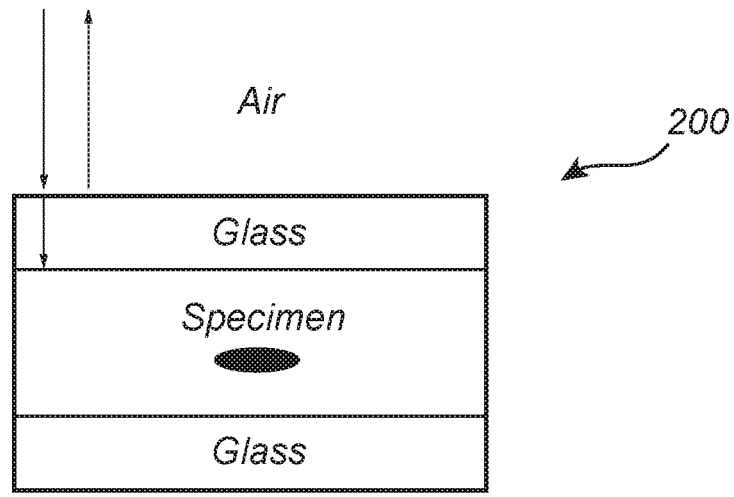
FIG. 3 is a schematic view illustrating interfaces in an optical path when illuminating a sample, according to example embodiments.

Referring now to FIG. 3, a system for illuminating an object 106 for holographic microscopy is described. A sample holder may be provided for arranging an object to be analyzed, a sample, in the imaging system 100 for holographic imaging. The sample holder may comprise a number of components for presenting the sample in the imaging system 100. The sample may for instance be a liquid and the sample holder may thus be arranged so as to be able to receive a liquid sample.

As illustrated in FIG. 3, when the sample holder is arranged in the optical path, the illumination light 104 will be incident on several interfaces between media having different refractive indices, such as going from air to glass covering the sample, to a fluidic sample, to a glass substrate on which the sample is arranged and further to air on the opposite side of the sample holder. Further, the imaging system 100 may also provide components for magnification in order to allow the sample to be imaged under magnification, as may be performed in holographic microscopy.

Figure 4A:
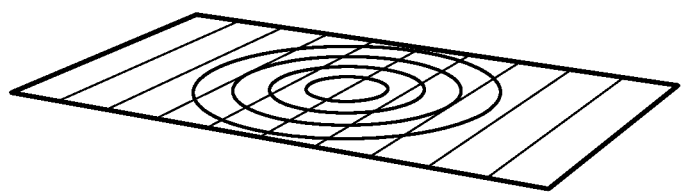
FIG. 4A is a schematic view of an interference pattern generated with illumination light of a laser driven above the threshold current, according to example embodiments.
Figure 4B:
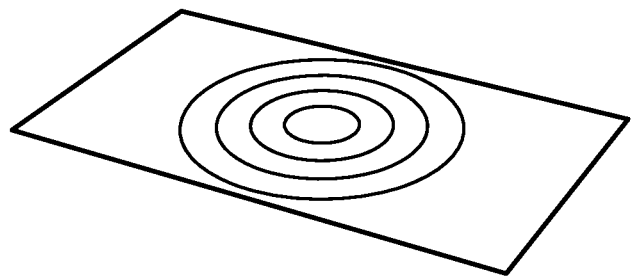
FIG. 4B is a schematic view of an interference pattern generated with illumination light of a laser driven below the threshold current, according to example embodiments.

Due to Fresnel reflection at the interfaces, there will be some light that will reach the image sensor after multiple reflections on the interfaces. As illustrated in FIG. 4A, if the illumination light has a high temporal coherence, such multiply reflected light may generate interference fringes and may affect the interference pattern formed by the illumination light interacting with the sample. However, as shown in FIG. 4B, with the illumination light 104 provided by the imaging system 100, the interference fringes will not be generated and a possibility of obtaining a quality hologram is highly increased.

As shown in FIG. 3, the illumination light 104 may illuminate a sample which is mostly transparent, which allows the illumination beam to interfere with itself, by unaffected light passing through the sample. Thus, the imaging system 100 may be arranged for in-line holographic imaging, which allows a compact arrangement of the imaging system 100.

It should however be realized that the imaging system 100 may be used in any manner for providing object light and reference light to interfere and form an interference pattern. For instance, the illumination light 104 may be split into an object beam and a reference beam. The object beam and the reference beam may be guided through different optical paths which are later re-combined once the object beam has interacted with the object 106.

Also, the object light may be affected in any way by interaction of the illumination beam with the object 106 to cause an interference pattern which may be analyzed. For example, the light may be attenuated, reflected, refracted, diffracted and/or phase modulated by interaction with the object 106.

Figure 5:
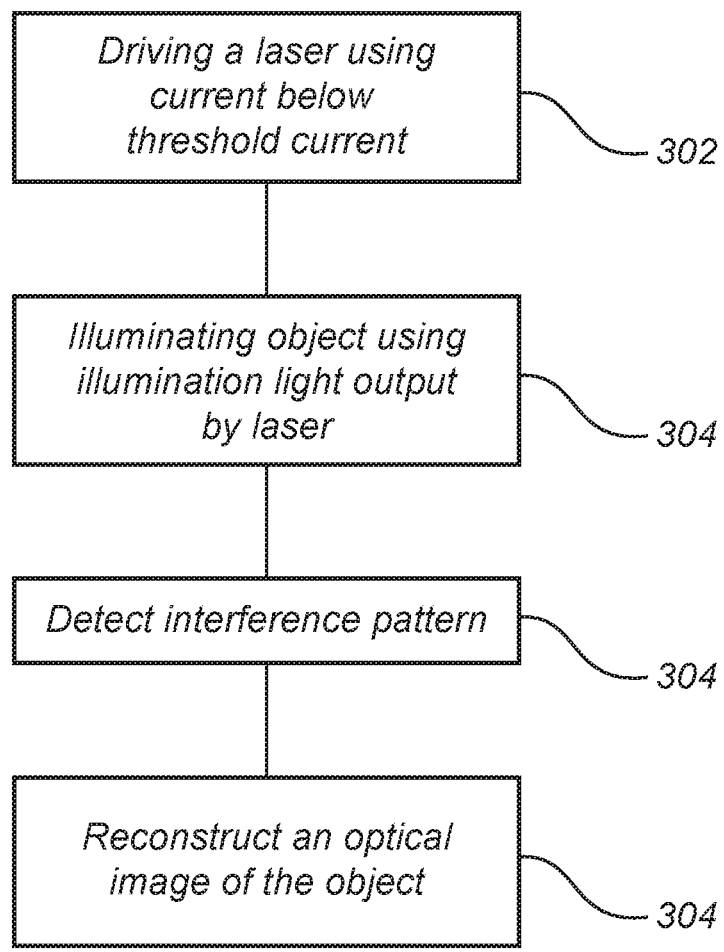
FIG. 5 is a flow chart of a method, according to example embodiments.

Referring now to FIG. 5, a method for holographic imaging will be described. The method may be achieved using the imaging system as described above.

The method comprises driving a laser using a current which is below the threshold current of the laser, step 302. The laser is thereby used in a subthreshold regime, wherein output illumination light is not dominated by stimulated emission.

The method further comprises illuminating an object using the illumination light output by the laser when the laser is driven by the subthreshold current, step 304. Thus, the object is illuminated using illumination light which may have a high spatial coherence, thanks to the laser inherently providing output of light from a narrow confinement, and a low temporal coherence, as the laser is not driven such that light output from the laser is dominated by stimulated emission.

The method further comprises detecting an interference pattern formed by object light having interacted with the object and reference light which is unaffected by the object, step 306. The interference pattern may thus comprise information of the object by the interaction caused by the object.

The method may further comprise reconstructing an optical image of the object, step 308. The optical image may then be used for analyzing the object or as a representation of the object.

In the above, the concept has mainly been described with reference to a limited number of examples. However, as is readily appreciated, other examples than the ones disclosed above are equally possible within the scope of the disclosure, as defined by the appended claims.

For example, it should be realized that the imaging system may be combined with further components, which may e.g. be used for forming the illumination light before being directed towards an object in the imaging system. Also, the imaging system may be combined with further components which may be used for magnification or for guiding of light after having interacted with the object. In fact, it should be realized that the use of a laser source which is driven using a subthreshold current may be used in any kind of system for holographic imaging.

The invention claimed is:

1. A method for holographic imaging of an object, comprising:
   driving a laser using a current which is below a threshold current of the laser;
   illuminating the object using illumination light output by the laser;
   detecting an interference pattern formed by object light, having interacted with the object, and reference light of the illumination light;
   controlling driver circuitry to control the current driving the laser;
   identifying undesired interference fringes in the detected interference pattern; and
   in response to identifying the undesired interference fringes:
      controlling the driver circuitry to decrease the current driving the laser; and
      detecting a second interference pattern based on the illumination light output by the laser driven using a decreased current.

2. The method according to claim 1, further comprising reconstructing an optical image of the object based on the detected interference pattern.

3. The method according to claim 1, wherein the decreased current is between 60% and 95% of the threshold current of the laser.

4. The method according to claim 1, wherein the object is a body fluid sample.

5. The method according to claim 1, wherein controlling the driver circuitry is based on an ambient temperature to the laser.

6. The method according to claim 1, wherein the object is imaged by in-line holographic imaging.

7. The method according to claim 1, wherein the method is performed as part of a holographic microscopy study.

8. An imaging system for holographic imaging, comprising:
   a laser source arranged to output illumination light towards an object;
   an image sensor comprising light-detecting elements arranged to detect an interference pattern formed by object light, having interacted with the object, and reference light of the illumination light; and
   a controller arranged to:
      control a current driving the laser source to maintain the current below a threshold current of the laser source;

receive an indication based on undesired interference fringes being identified in the detected interference pattern; and decrease the current driving the laser source based on the received indication.

9. The imaging system according to claim 8, wherein the controller is further arranged to control the image sensor to detect the interference pattern.

10. The imaging system according to claim 8, further comprising a processing unit arranged to receive the interference pattern from the image sensor and to reconstruct an optical image of the object based on the interference pattern.

11. The imaging system according to claim 8, wherein the laser source is a laser diode.

12. The imaging system according to claim 8, wherein the decreased current is between 60% and 95% of the threshold current of the laser.

13. The imaging system according to claim 8, wherein the controller is further arranged to control the current driving the laser source based on an ambient temperature to the laser source.

14. A measurement instrument comprising an imaging system, wherein the imaging system comprises:
a laser source arranged to output illumination light towards an object;
an image sensor comprising light-detecting elements arranged to detect an interference pattern formed by object light, having interacted with the object, and reference light of the illumination light; and
a controller arranged to:
control a current driving the laser source to maintain the current below a threshold current of the laser source;
receive an indication based on undesired interference fringes being identified in the detected interference pattern; and
decrease the current driving the laser source based on the received indication, and
wherein the measurement instrument is arranged to determine a measure of the object based on processing the detected interference pattern.

15. The measurement instrument according to claim 14, wherein the object is a body fluid sample.

16. The measurement instrument according to claim 14, wherein the controller is further arranged to control the image sensor to detect the interference pattern.

17. The measurement instrument according to claim 14, further comprising a processing unit arranged to receive the interference pattern from the image sensor and to reconstruct an optical image of the object based on the interference pattern.

18. The measurement instrument according to claim 14, wherein the laser source is a laser diode.

19. The measurement instrument according to claim 14, wherein the decreased current is between 60% and 95% of the threshold current of the laser.

20. The measurement instrument according to claim 14, wherein the controller is further arranged to control the current driving the laser source based on an ambient temperature to the laser source.

* * * * *